Sept. 28, 1937.　　　A. W. TONDREAU　　　2,094,285
SUPPORT AND ADJUSTMENT FOR VIEW FINDERS
Filed Sept. 10, 1935
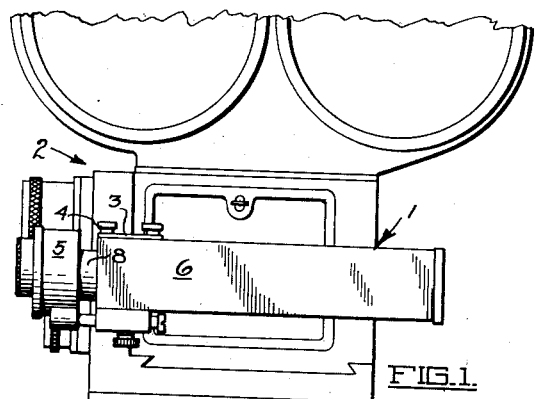
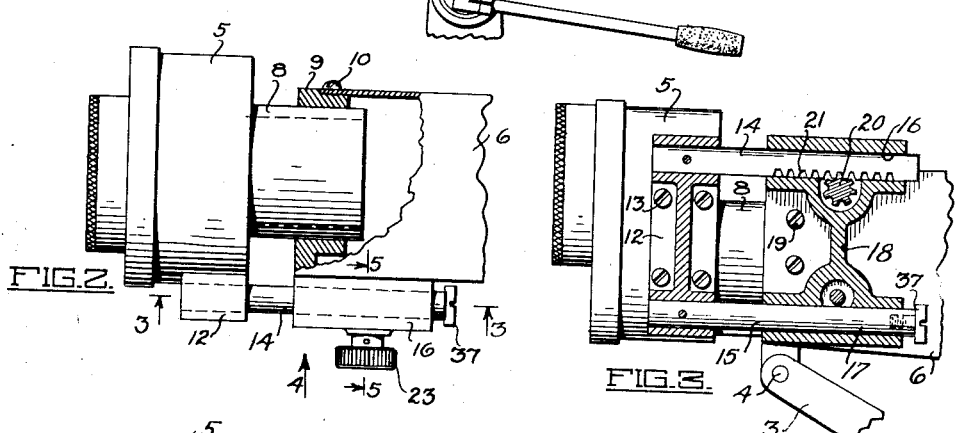
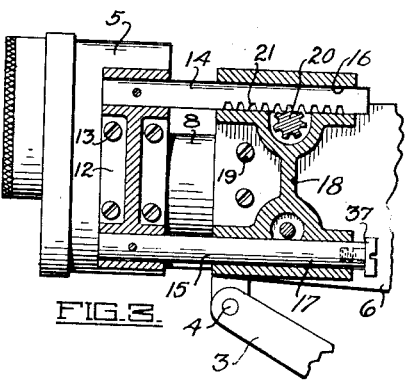
INVENTOR.
ALBERT W. TONDREAU
BY W. E. Beatty
ATTORNEY Patented Sept. 28, 1937

2,094,285

UNITED STATES PATENT OFFICE 2,094,285

SUPPORT AND ADJUSTMENT FOR VIEW FINDERS

Albert W. Tondreau, Hollywood, Calif., assignor to Warner Brothers Pictures, Inc., New York, N. Y., a corporation of Delaware Application September 10, 1935, Serial No. 39,945

6 Claims. (Cl. 88—1.5)

This invention relates to improvements in supporting and adjusting means for optical devices and refers particularly to a support and adjustment for a camera viewfinder.

A viewfinder for motion picture cameras usually comprises a pair of optical elements which are adjustable in relation to each other along the optical axis of the device to focus the viewfinder upon any portion of the field of view.

Especially when taking "running shots", etc., it is important that the viewfinger be quickly and easily focused so as to take a minimum amount of the operator's time. Furthermore, it is important that the two optical elements be rigidly supported in sliding relation to each other so as to prevent the vibrations of the viewfinder support or the movement of the adjusting means from throwing the two elements out of line in respect to the optical axis.

Heretofore, most viewfinders of which I am aware have been provided with a focusing screw knob which is threaded over a tubular extension coaxial with the optical axis of the viewfinder device. This extension is formed on a casing for one of the optical elements and carries that casing through the threadable engagement with the screw knob. The knob is rotatably carried upon a casing or housing for the other optical element whereby rotation of the knob causes the two casings to move in and out relative to each other. In this type of adjustment, the frictional area of the screw threads is necessarily large and also due to the position of the adjusting screw knob, it is rather awkward to manipulate especially if the camera operator is in a hurry as when photographing fast action "shots". Furthermore, in view of the fact that the supported casing is carried through the threaded engagement between the tubular extension of the casing and the adjusting screw knob and also in view of the fact that a sufficient amount of clearance must necessarily be allowed between the threaded bearing portions the supported casing has a tendency to wobble across the optical axis due to vibration of the viewfinder support or due to the adjusting movement itself.

One object of the present invention is to facilitate a quick and easy focusing adjustment of a camera viewfinder.

Another object of the invention is to rigidly support an adjustable optical element of a viewfinder.

The above and other obvious objects of the invention are accomplished by providing each element within a casing or frame. The main supporting means for the adjustable element and its casing comprises an extension formed on that member which is slideable with the casing for the other optical element. The adjustment comprises a rack gear formed on an auxiliary guide rod which is secured to one of the casings. The rack gear is adapted to be moved by a manually operated pinion rotatably carried by the second casing. Due to the ease with which the two elements may be adjusted in relation to each other, a locking device is provided to lock the two element in any adjusted position.

The supporting means for the adjustable element comprises three cylindrical guiding members whose centers are substantially the same distance apart from each other. By thus dividing the centers of support, there will always be two points of support which will be more or less in line with each other to check any side movement of the adjustable element and its frame in the direction of that line.

More particularly describing the invention, reference may be had to the accompanying drawing wherein Fig. 1 is a side elevation view of a motion picture camera with a viewfinder attached thereto.

Fig. 2 is an elevation view of the viewfinder with parts broken away to show the construction thereof.

Fig. 3 is a sectional bottom plan view of the viewfinder adjustment and is taken along the line 3—3 of Fig. 2.

Fig. 4 is a bottom plan view of the viewfinder with parts broken away and is taken in the direction of the arrow 4 of Fig. 2.

Fig. 5 is a transverse sectional view through the viewfinder adjustment and is taken along the line 5—5 of Fig. 2.

Referring now to Fig. 1, the viewfinder generally indicated at 1, is supported at the side of a conventional motion picture camera, generally indicated at 2. A supporting arm 3 secured to the side of the camera 2 pivotally supports the viewfinder 1 as at 4 (Figs. 3 and 4) for movement about a vertical axis to allow the viewfinder to be adjusted for stereo-parallax between the main objective lens of the camera and the optical axis of the viewfinder. The viewfinder 1 comprises a pair of optical elements one of which is provided within a casing or frame 5, the other being mounted within a second casing or frame 6 which comprises the main body portion of the viewfinder 1 as shown at 7, Fig. 4. The element within the casing 5 preferably consists of an erecting prism and may have associated therewith an objective lens to magnify the field of view. A tubular extension 8 formed on the rear of the casing 5 allows the field of view to be viewed therethrough and also provides a sliding surface which is adapted to be received within a bearing portion formed within a head 9. Head 9 is secured to the forward portion of the casing 6 as by screws 10. The element 7 within the casing 6 preferably comprises a plano-convex lens having a frosted or sandblasted surface on the plane face thereof to receive the image projected thereon. A second plano-convex lens 11 may be provided towards the rear of the casing 6 to magnify the image formed on the lens 7. A bracket 12 is suitably secured to the bottom portion of the casing or head 5 by means of screws 13 and carries a pair of rearwardly extending guide rods 14 and 15. These rods 14 and 15 are received within bearing portions 16 and 17 formed within a bracket 18 which is suitably secured to the forward end of the casing 6 by means of screws 19. One of the guide rods 14 has formed therealong a series of rack gear teeth 21 which mesh with a pinion 20. Pinion 20 is formed upon a short stub shaft 22 having a knurled focusing knob 23 secured to the lower portion thereof. Shaft 22 is journaled within bearing portions 24 and 25 formed within the bracket 18. The bearing 25 comprises a ring 26 pressed or otherwise suitably secured within the bracket 18 and receives a pin 27 passing therethrough which engages a groove 28 formed on the upper end portion of the shaft 22 to prevent longitudinal movement thereof. Thus, it will be seen that rotation of the adjusting knob 23 will effect a relative movement of the casings 5 and 6 along the optical axis of the viewfinder.

The guide rod 15 is adapted to be engaged by a locking device generally indicated at 30 to lock the viewfinder in any focused position. Referring to Fig. 5, this locking device 30 comprises a threaded rod 31 having a head 32 formed at one end thereof. The head 32 is adapted to slide up and down within an aperture 33 formed along the bracket 18. An arcuate surface 34 formed at one side of the head 32 is adapted to frictionally engage a portion of the guide rod 15 so as to prevent relative movement of the rod 15 and the bracket 18. A knurled locking nut 35 engages the threaded portion of the rod 31 and upon rotation is adapted to draw the head 34 into frictional engagement with the rod 15. A screw 36 having a head thereon is threaded within an aperture provided in the end of the rod 31 to prevent withdrawal of the nut 35 from the threaded portion of the rod 31. In order to prevent accidental withdrawal of the tubular extension 8 from the head 9 of casing 6 a screw 37 (Fig. 3) is threaded within the end of the guide rod 15. The head of screw 37 is adapted to engage the end of the bracket 18 and thus prevent further movement of the rod 15 in an outward direction.

In the operation of the viewfinder device, the camera operator looks through the open end of the viewfinder as at 40 to determine the field of view and then adjusts the focusing knob 23 until the correct focus is obtained. In the case where the field of view is to remain in focus at the same distance from the camera during the entire shot, the locking device 30 may be utilized to prevent the casing 5 from being accidentally moved out of focus. However, in the case of a running or action shot, where the distance between the camera and the field of view is constantly changing the locking nut 35 may be backed off to provide for free movement of the casing 5 and its optical element at all times.

Having thus described the invention, what is claimed as new and desired to secure by Letters Patent, is:

1. An adjustable viewfinder comprising a lens mount having a tubular extension, a head having an aperture adapted to have said extension slidable therein, a bracket mounted on said head having apertures therein adapted to constitute bearing portions, a pair of rods attached to said lens mount and adapted to slide within said bearing portions of said bracket, the axis of said tubular extension and the axes of said rods lying substantially equi-distant from each other, means for applying a force to one of said rods for moving said lens mount, and means operating on the other of said rods for locking said lens mount in position.

2. An adjustable viewfinder in accordance with claim 1 in which said last mentioned locking means comprises a screw having an enlarged portion at one end thereof with a configuration conforming to that of said rod, and a thumb nut adapted to increase the friction between said rod and said enlarged head for locking said rod in position.

3. An adjustable viewfinder comprising a lens mount having a tubular extension, a support for said lens mount having an aperture therein adapted to accommodate said extension, a bracket on said support having apertures at the extremities thereof, a pair of rods attached to said lens mount adapted to slide within said bracket apertures, the axes of said rods and the axis of said extension forming substantially an equilateral triangle, means for applying a force to one of said rods for adjusting said lens mount, and a screw having an enlarged head with a configuration conforming to the configuration of and contacting said second rod for locking said lens mount in position.

4. An adjustable viewfinder comprising a lens mount having a hollow tubular extension adapted to pass light therethrough, a support in which said extension is adapted to be slidably mounted, said extension forming one point of support for said lens mount, a pair of rods having their axes spaced equi-distant from the axis of said extension, the distance between the axes of said rods being substantially the same as the distance between the axis of said extension and one of said rods, a bracket having bearing portions in which said rods are adapted to be slidably mounted, means for actuating one of said rods for adjustment of said lens mount and means for clamping the other of said rods for locking said lens mount in adjusted position.

5. An adjustable optical system comprising fixed optical elements, a mounting for said elements having an aperture at one end thereof, a movable lens mount having a hollow tubular extension adapted to be slidably mounted within said aperture, a pair of rods attached to said movable lens mount, a bracket on said fixed lens mount having bearing portions in which said rods are adapted to be slidably adjusted, means operating on one of said rods for adjusting said movable lens mount, and means operating on the other of said rods for locking said movable lens mount with respect to said fixed lens mount, the tubular lens element and said rods forming three-points of support for said movable lens mount, the three axes thereof being substantially equi-distant from each other.

6. An adjustable optical system in accordance with claim 5 in which said movable lens mount adjusting means and said locking means include thumb nuts having vertical axes and positioned under said system adjacent one another.

ALBERT W. TONDREAU.